United States Patent
Wightman et al.

(10) Patent No.: US 10,125,699 B2
(45) Date of Patent: Nov. 13, 2018

(54) METHOD AND ACTUATOR FOR USE ON AN ENGINE HAVING A MONITORING ARRANGEMENT FOR DETERMINING A CHARACTERISTIC OF [(AND)] THE ACTUATOR AND SYSTEM

(71) Applicant: BorgWarner, Inc., Auburn Hills, MI (US)

(72) Inventors: Brian Wightman, Davisburg, MI (US); Ryan Howell, Hendersonville, NC (US)

(73) Assignee: Borgwarner Inc., Auburn Hills, MI (US)

( * ) Notice: Subject to any disclaimer, the term of this patent is extended or adjusted under 35 U.S.C. 154(b) by 162 days.

(21) Appl. No.: 15/342,567

(22) Filed: Nov. 3, 2016

(65) Prior Publication Data

US 2018/0119626 A1    May 3, 2018

(51) Int. Cl.
| | |
|---|---|
| *G01B 7/14* | (2006.01) |
| *F02D 41/00* | (2006.01) |
| *H02K 11/215* | (2016.01) |
| *H02K 11/30* | (2016.01) |
| *G01D 5/14* | (2006.01) |
| *H02K 21/14* | (2006.01) |
| *F02D 41/22* | (2006.01) |
| *H02K 21/16* | (2006.01) |
| *H02K 29/08* | (2006.01) |
| *H02K 29/10* | (2006.01) |
| *H02K 29/12* | (2006.01) |
| *H02K 1/27* | (2006.01) |

(Continued)

(52) U.S. Cl.
CPC ......... *F02D 41/0007* (2013.01); *F02D 41/22* (2013.01); *G01D 5/14* (2013.01); *H02K 1/2773* (2013.01); *H02K 7/14* (2013.01); *H02K 11/215* (2016.01); *H02K 11/30* (2016.01); *H02K 21/14* (2013.01); *H02K 21/16* (2013.01); *H02K 29/08* (2013.01); *H02K 29/10* (2013.01); *H02K 29/12* (2013.01); *F02D 2400/08* (2013.01); *F16H 19/001* (2013.01); *F16H 21/44* (2013.01); *G01D 5/245* (2013.01); *H02K 11/33* (2016.01)

(58) Field of Classification Search
CPC .. F02D 41/0007; F02D 2400/08; F02D 41/22; F16H 19/001; F16H 21/44; G01D 5/14; H02K 11/215; H02K 11/30; H02K 21/14; H02K 11/33; H02K 1/2773; H02K 21/16; H02K 29/08; H02K 29/10; H02K 29/12; H02K 7/14
See application file for complete search history.

(56) References Cited

U.S. PATENT DOCUMENTS

| | | | |
|---|---|---|---|
| 7,064,508 B2 | 6/2006 | Keefover et al. | |
| 7,187,153 B2 * | 3/2007 | Imagawa | ............... B62D 5/046 318/560 |

(Continued)

*Primary Examiner* — Vinh Nguyen
(74) *Attorney, Agent, or Firm* — Warn Partners, P.C.

(57) ABSTRACT

A method, using multiple position sensors, for determining a characteristic of the actuator or a system, wherein the characteristic is causing or is indicative of the cause of the change in position of the actuator. One characteristic may be the lost motion of the actuator or system. Lost motion is the lag between the motion of a controlled device and that of an electrical drive device due to yielding or looseness. The lost motion of an actuator may increase as components wear and may eventually degrade the function or cause failure of the actuator and/or system.

25 Claims, 8 Drawing Sheets

(51) Int. Cl.
*H02K 7/14* (2006.01)
*F16H 19/00* (2006.01)
*F16H 21/44* (2006.01)
*H02K 11/33* (2016.01)
*G01D 5/245* (2006.01)

(56) References Cited

U.S. PATENT DOCUMENTS

| | | | |
|---|---|---|---|
| 7,876,092 B2 * | 1/2011 | Sasaki | G01D 5/2497 |
| | | | 324/207.25 |
| 8,118,276 B2 | 2/2012 | Saunders et al. | |
| 8,803,388 B2 | 8/2014 | Keefover et al. | |
| 9,680,348 B2 * | 6/2017 | Rodger | H02K 7/116 |
| 9,879,596 B1 * | 1/2018 | Bogen | F02B 37/24 |

\* cited by examiner

METHOD AND ACTUATOR FOR USE ON AN ENGINE HAVING A MONITORING ARRANGEMENT FOR DETERMINING A CHARACTERISTIC OF [(AND)] THE ACTUATOR AND SYSTEM

FIELD OF THE INVENTION

The present invention relates to a method for determining a characteristic of an actuator and a system.

BACKGROUND OF THE INVENTION

Controlled devices may be used for regulating functions of an internal combustion engine. These functions may include; the boost pressure within the intake manifold of the engine, intake air flow control, and exhaust gas flow control. The types of controlled device that may be used may include; turbochargers, exhaust gas recirculation valves, flap style valves, poppet valves, or throttle valves. Many controlled devices use an apparatus to control their functions and performance. For example, pneumatic and electric actuators are used to provide positional control of variable vanes on the turbocharger to adjust and maintain the pressure within the intake manifold of an engine. Controlling the intake manifold pressure may provide optimum performance while maintaining legislated vehicle emissions. Therefore accurate positioning of the controlled device, by the actuator, is desirable for providing optimum results.

SUMMARY OF THE INVENTION

The present invention relates to a method for determining a characteristic of an actuator including several steps. During a first step an actuator is provided that includes an electrical drive device connected to a power source. There is also a rotor rotatably positioned within the electrical drive device such that the rotor rotates in response to energization of the electrical drive device. The rotation of the rotor generates a movable force output of the electrical drive device. Also provided is a driven member connected to an output element connectable to a controlled device. The driven member is connected between the electrical drive device and the output element, where the driven member receives the movable force output of the electrical drive device and transfers at least a portion of the movable force output to the controlled device through the output element.

During a next step the method includes providing a first position sensor connected in proximity to the electrical drive device or driven member for sensing movement, lack of movement and position of the electrical drive device, driven member or output element, which is conveyed by the first sensor as at least one first sensor output value. Then the method includes further providing a second position sensor connected to the driven member or output element for sensing movement, lack of movement and position of the output element which is conveyed by the second sensor as a least one second sensor output value. The method also provides a controller connected to the actuator or separate from the actuator, wherein the controller is configured to receive the at least one first sensor output value and the at least one second sensor output value.

Next a step of commanding the actuator with the controller to activate the electrical drive device to drive and maintain the output element to at least one commanded position occurs. Then a step of generating the at least one first sensor output value of the first sensor and transmitting the at least one first sensor output value to the controller takes place. Also a step of generating at least one second sensor output value from the second sensor and transmitting the at least one second sensor output value to the controller also takes place. Then a step of calculating at least one present measurable characteristic in the controller occurs by calculating the difference between the at least one first sensor output value in the at least one second sensor output value. Then a step of recording at least one present measurable characteristic in a database occurs.

Once the at least one present measurable characteristic has been calculated a step of determining performance is carried out. Performance is defined by a rate of change of the characteristic over time or actuator failure including lost motion, life expectancy, accuracy and future maintenance; where the controller compares the at least one present measurable characteristic with an algorithm based on one or more reference values previously recorded or programmed into the database. When the at least one present measurable characteristic is less than the reference value, the characteristic of the actuator is acceptable. When the at least one present measurable characteristic is greater than the reference value, the characteristic of the actuator is unacceptable.

The subject invention provides a method, using multiple position sensors, for determining a characteristic of the actuator or a system, wherein the characteristic is causing or is indicative of the cause of the change in position of the actuator. One characteristic may be the lost motion of the actuator or system. Lost motion is the lag between the motion of an electrical drive device and that of the output element, or a controlled device due to yielding or looseness. The lost motion of an actuator may increase as components wear and may eventually degrade the function or cause failure of the actuator and/or system.

The method for sensing lost motion in accordance with the present invention is useful with many types of actuator applications for use on an engine having a monitoring arrangement for monitoring a characteristic of the actuator. The actuator includes an electrical drive device, which can be for example, but not limited to a direct current motor, a stepper motor, a brushless direct current motor or another type of electrical drive device. The electrical drive device is connected to a power source and has a rotor to rotate in response to an electrical input. The rotation of the rotor generates a moveable force output of the electrical drive device.

The actuator also includes an output element connectable to a controlled device. Examples of controlled devices include, but are not limited to, controlled devices for controlling engine or vehicle functions including boost pressure within the intake manifold of an engine, intake air flow control and exhaust control. Examples of controlled devices include turbochargers, exhaust gas recirculation valves, flap style valves, poppet valve or throttle valves. Between the electrical drive device and the output element is a driven member, which in one example is a gear train; however the driven member can take many forms including belts, levers, cams, etc. The driven member receives the moveable force output of the electrical drive device and transfers at least a portion of the moveable force output to the output element.

The actuator also includes a first position sensor connected to the electrical drive device or the driven member in a location that allows the first position sensor to measure or sense movement, lack of movement and position of the electrical drive device, driven member or output element. The first position sensor is capable of generating at least one first sensor output value sensing movement of the electrical drive device, the driven member or the output element. A second position sensor is connected to the driven member, output element for sensing movement, lack of movement and position of the driven member or output element. The second position sensor generates at least at least one second sensor output value.

The arrangement further includes a controller connected to the actuator or separate from the actuator wherein the controller is configured to receive the at least one first sensor output value and the at least one second sensor output value through a hardwire electrical connection or by using wireless signals such as Wi-Fi, Bluetooth® or other wireless signal types. The controller determines or calculates at least one present measurable characteristic of the actuator, which is determined by calculating the difference between the at least one first sensor output value and the at least one second sensor output value. The at least one present measurable characteristic is recorded in a database of the controller and is used for several purposes including monitoring past and present actuator performance issues as well as extrapolating when future issues or maintenance will be needed.

The invention also provides a method for determining the rate at which the lost motion is changing over an interval. The ability to determine the lost motion and the rate at which it may change may be useful in identifying an immediate or future issue with the actuator and/or system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
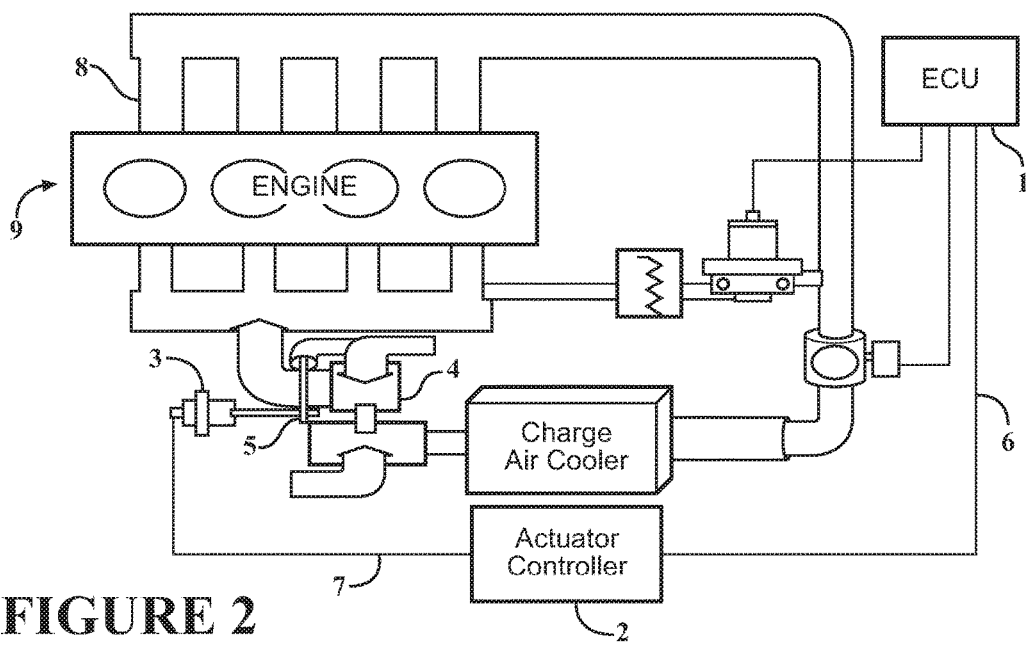
FIG. 1 shows a schematic diagram of a system using an actuator to control a turbocharger to regulate the boost pressure within the intake manifold of an internal combustion engine.

FIG. 1 shows a schematic of a system that uses an actuator to control a turbocharger to regulate the boost pressure within the intake manifold 8 of an internal combustion engine 9. As shown in FIG. 1 the system includes the vehicle's electronic control unit (ECU) 1, controller 2, actuator 3, turbocharger 4, and variable vane control 5 (of turbocharger 4), however, it is within the scope of this invention for a greater or lesser number of components to be used. The ECU 1 is connected to the controller 2 by a wire harness 6 having multiple conductors and connectors. The controller 2 is also connected to the actuator 3 by a wire harness 7 having multiple conductors and connectors. For this illustration the controller 2 is shown as a separate component but it is also possible for it to be integrated within actuator 3 or within the ECU 1.

The system shown in FIG. 1 functions as follows, ECU 1 provides an electrical position input signal to the controller 2 that indicates a desired position of actuator 3. The desired position also is referred to as the commanded position of the actuator 3. The controller 2 provides the necessary electrical control signal to move actuator 3. Actuator 3 moves the variable vane control or mechanism 5 of turbocharger 4, to a position in order to achieve a desired pressure within the intake manifold 8 of engine 9. Actuator 3 also includes sensors for sensing the position of the actuator and provide feedback in the form of an electrical position output signal to the controller 2. When this occurs a "closed loop" control scheme is used to maintain a commanded actuator position by comparing the feedback electrical position output signal value to a commanded value and adjust the electrical control signal, to actuator 3, to maintain the position and the desired boost pressure.

The actuator 3 uses an electrical drive device such as D.C. motor for providing a moveable force. The motor uses brushes for commutating its rotating member or it may be brushless or other type of motor. The actuator output may be rotary or linear motion and may also comprise a driven member, including a shaft or output element, for translating the moveable force of the electrical drive device to the controlled device such as that of a turbocharger or valve. The driven member has a plurality of engaged gears, a linkage, a plurality of gears and chains, a plurality of gears and drive belts, a plurality of pulleys and drive belts, shafts or a combination thereof. Specific motors and sensor arrangements will be described in greater detail below. The mechanism 5 is connected to the output of actuator 3 as described below.

Sensing position of the actuator 3 and the mechanism 5 can use an absolute or relative position sensor to operably monitor the movement, lack of movement, and position of the electrical drive device or the driven device. An absolute sensor is a type wherein the output at a given position may be directly translated to that position. For example, if an absolute sensor has an output range of 0.0 to 5.0 volts D.C. (VDC), an electrical output signal of 2.5 volts may indicate a position at 50% of the total range of movement. Stated another way, if the total range of movement were 90 degrees, the 2.5 VDC would represent a position of 45 degrees. For this example the output of the position sensor was an analog signal ranging from 0.0 VDC to 5.0 VDC. The output of the absolute sensor may also be a digital signal which may indicate the absolute position. A relative sensor is a type wherein steps or changes-in-a-state are measured from a reference point. The change in state may be an electrical voltage or current level when a D.C. motor is commutated. Alternatively the reference point may be a physical stop at each end of the total range of movement (or span) of the actuator. For example if there is a total of 200 steps over the total range of movement of the actuator, a measurement of 100 steps may indicate a position at 50% of the total range. Stated another way, if the total range were 90 degrees of movement, the 100 steps would represent a position of 45 degrees.

Figure 2:
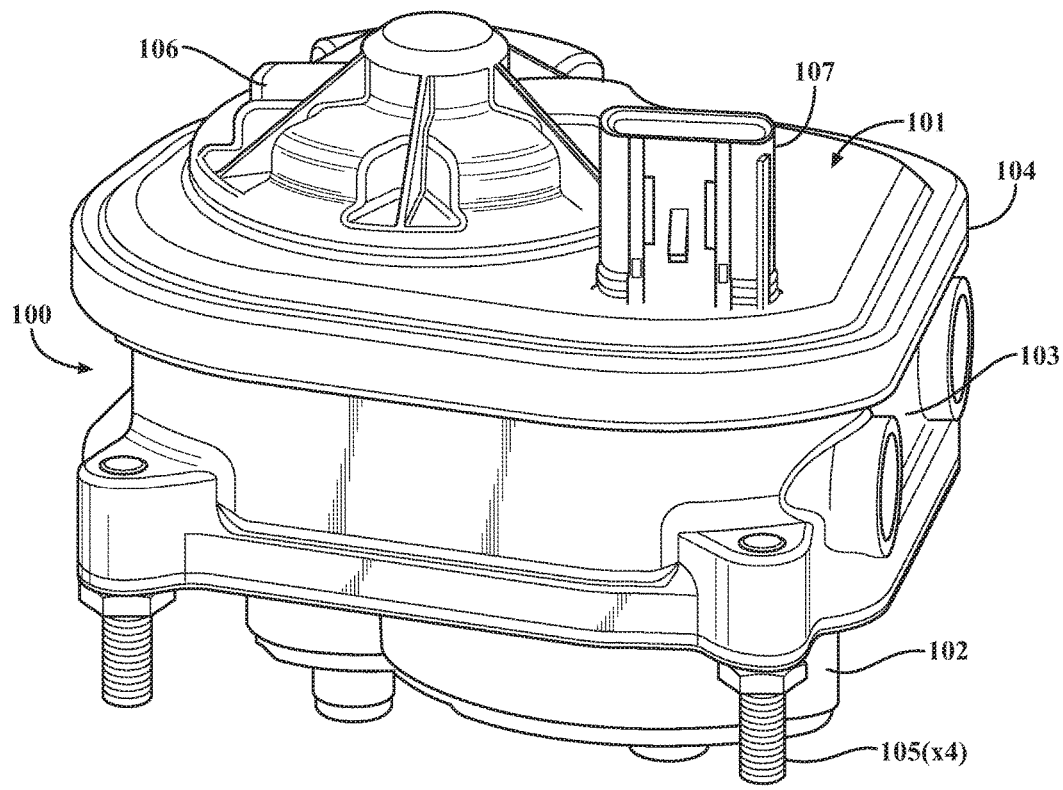
FIG. 2 shows a three dimensional perspective view of an actuator in accordance with one embodiment of the present invention.
Figure 3:
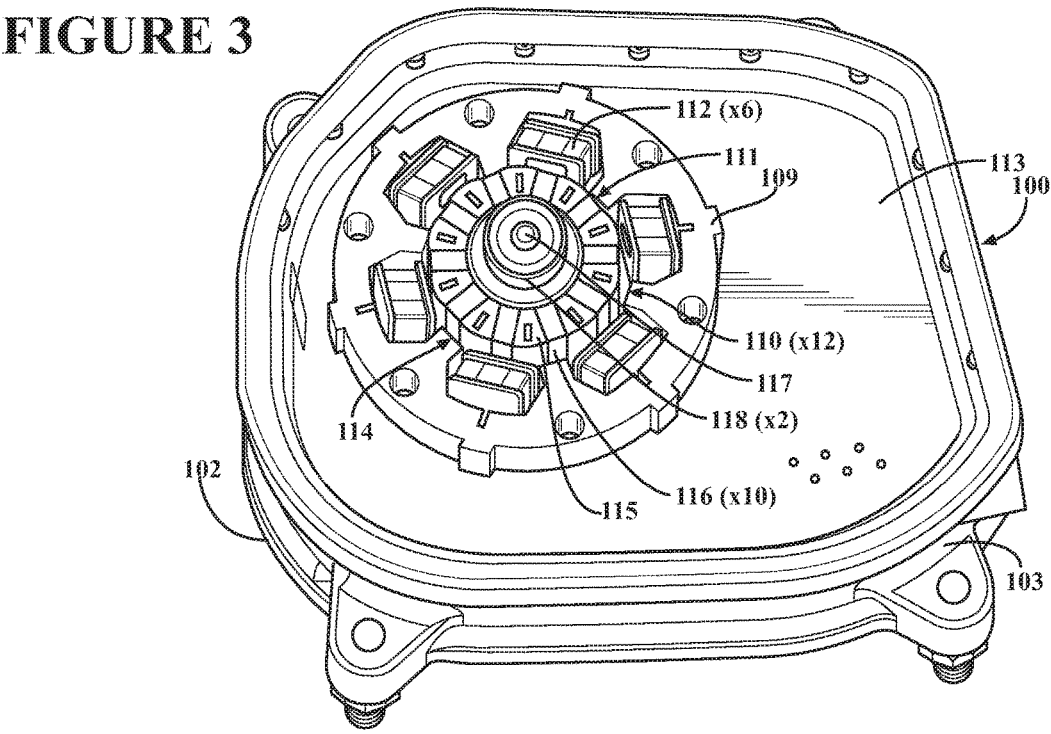
FIG. 3 shows a three dimensional perspective view of an actuator having a housing removed to show the internal components in accordance with one embodiment of the present invention.

FIG. 2 and FIG. 3 show one type of actuator 100 that the method of determining a characteristic is implemented on. Actuator 100 as shown includes a first housing 101, a second housing 102 and a third housing 103. First and third housings 101, 103 may be secured to each other by a clinch ring 104. Second and third housings 102, 103 may be secured to each other by threaded fasteners 105. However, it is within the scope of this invention for a greater or lesser number of housings to be implemented. First housing 101 include an electrical drive device 106 that provides a moveable force in response to an electrical control signal. The electrical drive device 106 is a motor that can be several motor types including a brush D.C. motor, a stepper motor, a brushless D.C. motor or another type of electrical drive device. It is also within the scope of this invention for the electrical drive device 106 to be a separate component secured in the first housing 101 or include several components that may be secured as a portion of first housing 101 as shown in FIG. 2 and FIG. 3.

First housing 101 also includes an electrical connector 107, formed as a portion of the first housing 101 or alternatively it can also be part of separate component attached by fasteners or other suitable methods. Electrical connector 107 typically includes a number of terminals (not shown) formed as a portion of electrical conductors or a lead frame that are operably attached to the first housing 101. The electrical conductors (not shown) provide the desired electrical connections, including desired electrical control signals between terminals 108 and the electrical drive device 106.

Figure 6:
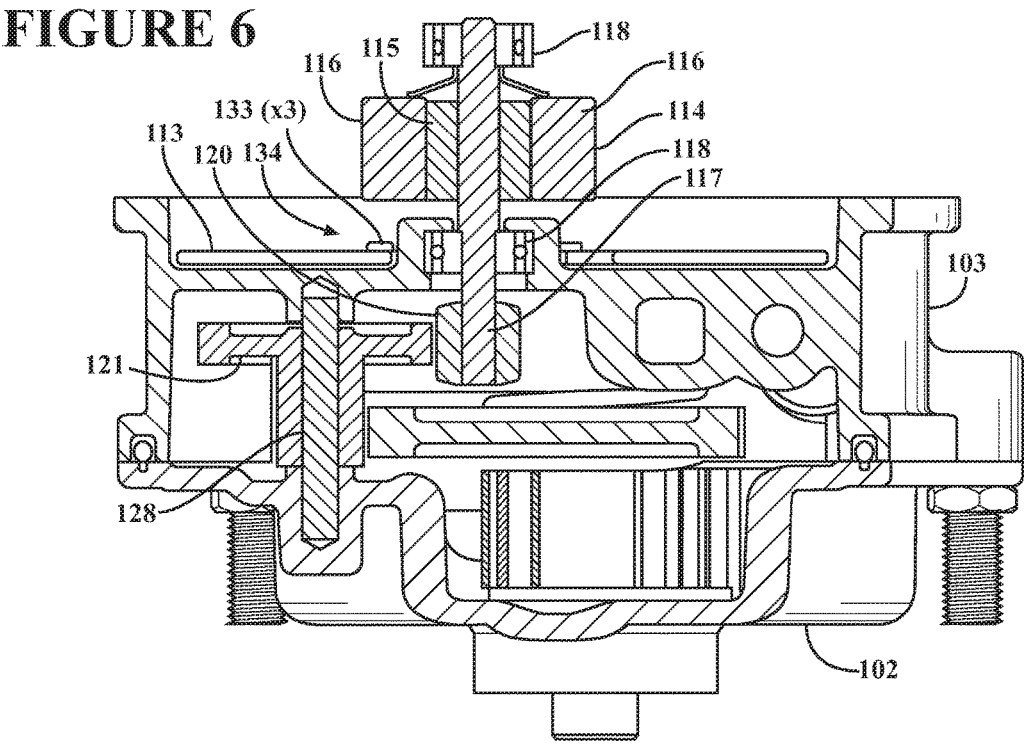
FIG. 6 shows a side cross-sectional plan view taken alone section lines 6-6 show in FIG. 5.
Figure 14:
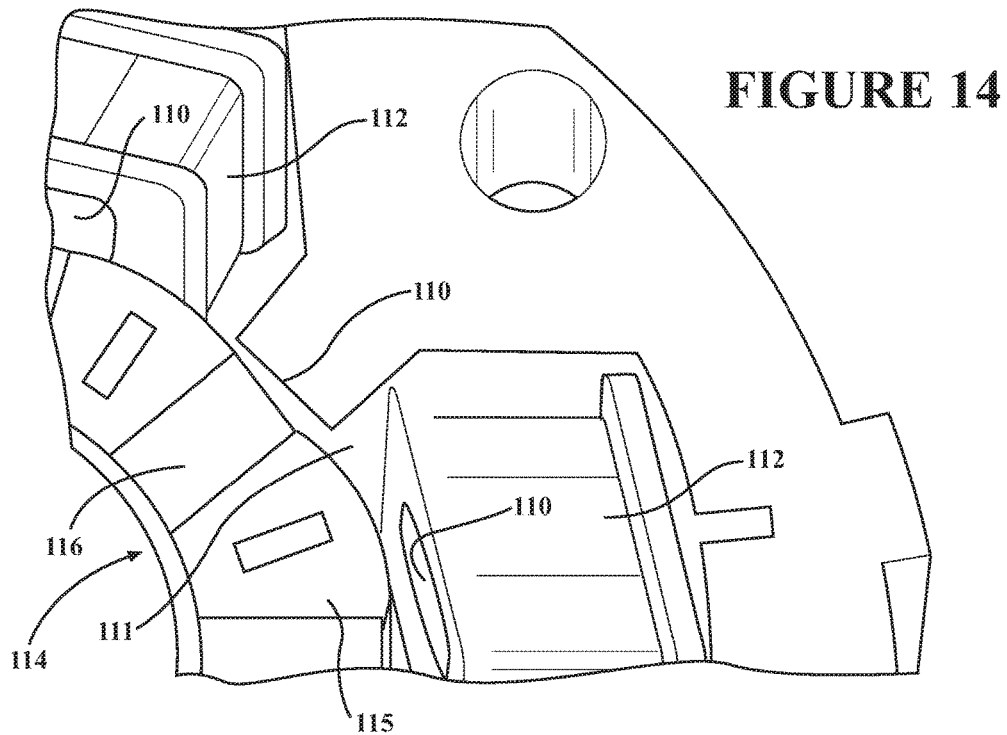
FIG. 14 shows an enlarged portion of the stator and rotor shown in FIG. 3.

As previously stated, the electrical drive device 106 may be a brushless D.C. (BLDC) motor 113. FIG. 3 shows a view of the actuator 100 with the BDLC motor 200 in accordance with one embodiment of the invention. FIG. 3 shows the over molding of first housing 101 removed to provide a view of the BLDC motor 200 and its components, which include a stator 109 having a number of teeth 110 shaped radially inward and forming a cylindrical opening 111. FIG. 14 is an enlarged view of a portion of FIG. 3, and shows the location of three of the teeth 110 and the cylindrical opening 111 in greater detail. A plurality of coils 112 are mounted on alternating teeth 110 and are connected to an electrical circuit 113. A rotor 114 is rotatably positioned within the cylindrical opening 111 and includes a metal hub 115 having openings for receiving permanent magnets 116. A shaft 117 is connected to rotor 114 and rotates with rotor 114. Shaft 117 is supported within the first and third housing 101, 103 by a bearings 118 as shown in FIG. 3 and FIG. 6, however, it is within the scope of this invention for the shaft 117 to be supported by other structures and supported by different housings. Shaft 117 provides a moveable force when the coils 112 receive an electrical control signal from the electrical circuit 113 that forces the rotation of rotor 114 due to magnetism between the magnets of the rotor and the induced magnetic field of the coils 112 upon energization. The electrical control signal is provided by an controller located on electrical circuit 113 or; from an external electrical control unit (ECU) or controller 2 as previously described herein.

Figure 4:
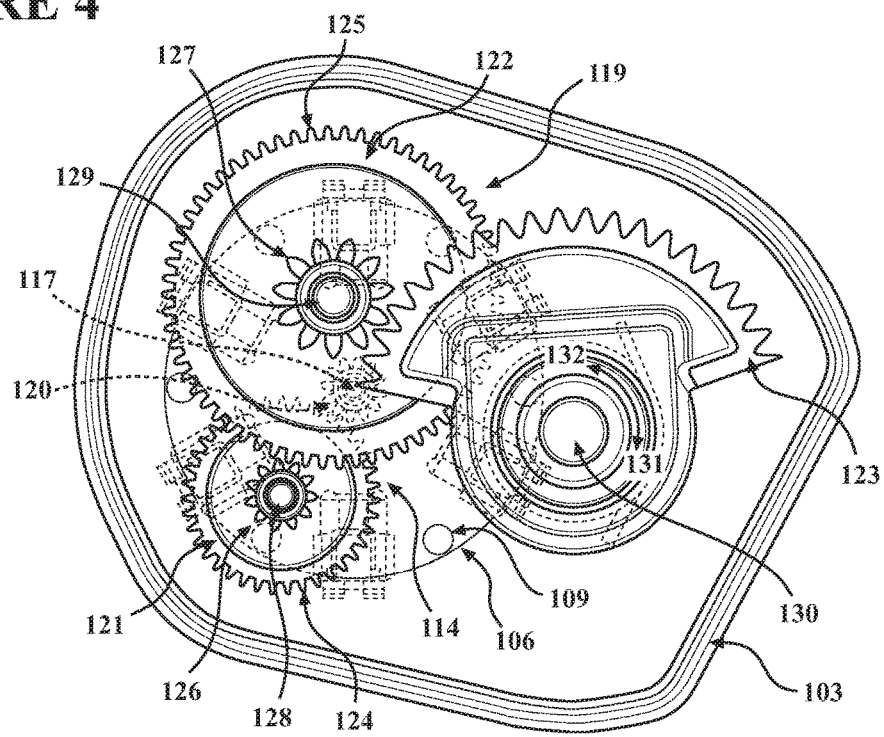
FIG. 4 shows a top plan view of an actuator having a housing removed to show the internal components in accordance with one embodiment of the present invention.

FIG. 4 shows a view inside actuator 100 with second housing 102 removed. Some components of FIG. 4 are shown in phantom or broken lines to show the some components or portions of a driven member 119 and their connections between the electrical drive device 106 and an output element 130 of an actuator. Driven member 119 includes a first pinion gear 120 connected to the same shaft 117 that is connected to the rotor 114 in FIG. 3. The pinion gear 120 is engaged with second gear 121, third gear 122 is engaged with second gear 121, and fourth gear 123 is engaged with third gear 122 to create what is referred to as a gear train, which is used to transmit rotational force from the electrical drive device 106 through the driven member 119 to the output element 130 that connects to the mechanism 5 (shown in FIG. 1). As shown in FIG. 4 the second and third gears 121, 122 are compound gears having gear teeth on first sections 124, 125 and second sections 126, 127 to facilitate engagement with two gears. While four gears are shown and described, it is within the scope of this invention for a greater or lesser number of gears to be used depending on the needs of a particular application. Also it is within the scope of this invention for a different type of driven member 119 to be used. For example instead of a group of gears the driven member 119 could be belts, cams, hydraulic cylinders, or any type of linear or rotary driven member, etc. Also the output element 130 as shown is a shaft connected to the mechanism 5, however, it is within the scope of this invention for the output element 130 to take other forms, for example the output element or mechanism 5 could be a gear in mesh with other gears, belts, chains, cams, scotch yoke, etc. positioned inside or outside of the actuator 3.

Figure 7:
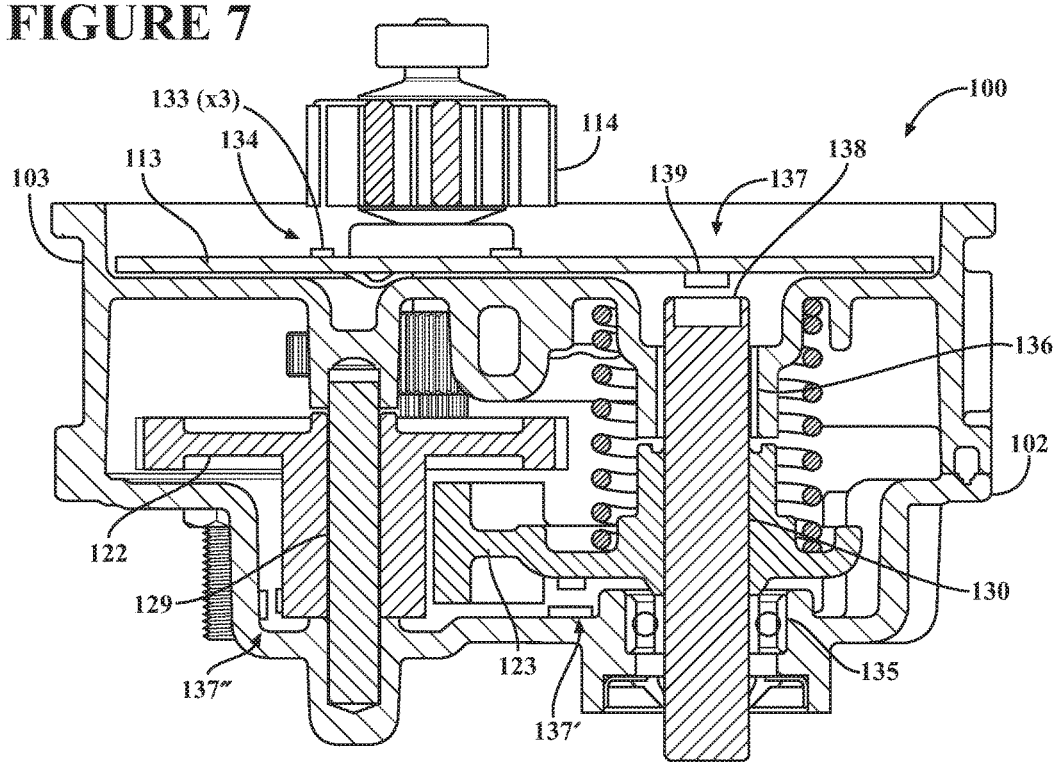
FIG. 7 shows a side cross-sectional plan view taken alone section lines 7-7 show in FIG. 5.

The first pinion gear 120 of driven member 119 are connected-to-and rotatable with shaft 117 of the electrical drive device 106. The second and third gears 121, 122 are rotatably coupled to the second and third housing 102, 103 by pins 128, 129. The output element 130 extends through the housing 102 to the mechanism 5, as shown in FIGS. 1-7. The output element 130 is operably connected-to-and rotatable with the fourth gear 123. The driven member 119 will translate the moveable force provided by the electrical drive device 106 to the output element 130. The output element 130 may also be rotatably coupled to the second and third housing 102, 103 by bearing 135 and bushing 136 as shown in FIG. 7.

The actuator 100, in accordance with one embodiment of the invention functions, in the following manner. An electrical control signal is provided to the electrical drive device 106 of actuator 100 and provides a moveable force to the shaft 117. The moveable force is translated to the driven member 119 to force rotation of; the first pinion gear 120, second gear 121, third gear 122, fourth gear 123 and output element 130. The direction of rotation may be dependent upon the polarity of the electrical control signal applied to the electrical drive device 106. For example, a first polarity may force the electrical drive device 106, the rotatable shaft 117, and the driven member 119 to rotate the output element 130 in a first direction 131 and; a second polarity may force the electrical drive device 106, the rotatable shaft 117, and the driven member 119 to rotate the output element 130 in a second direction 132.

Figure 5:
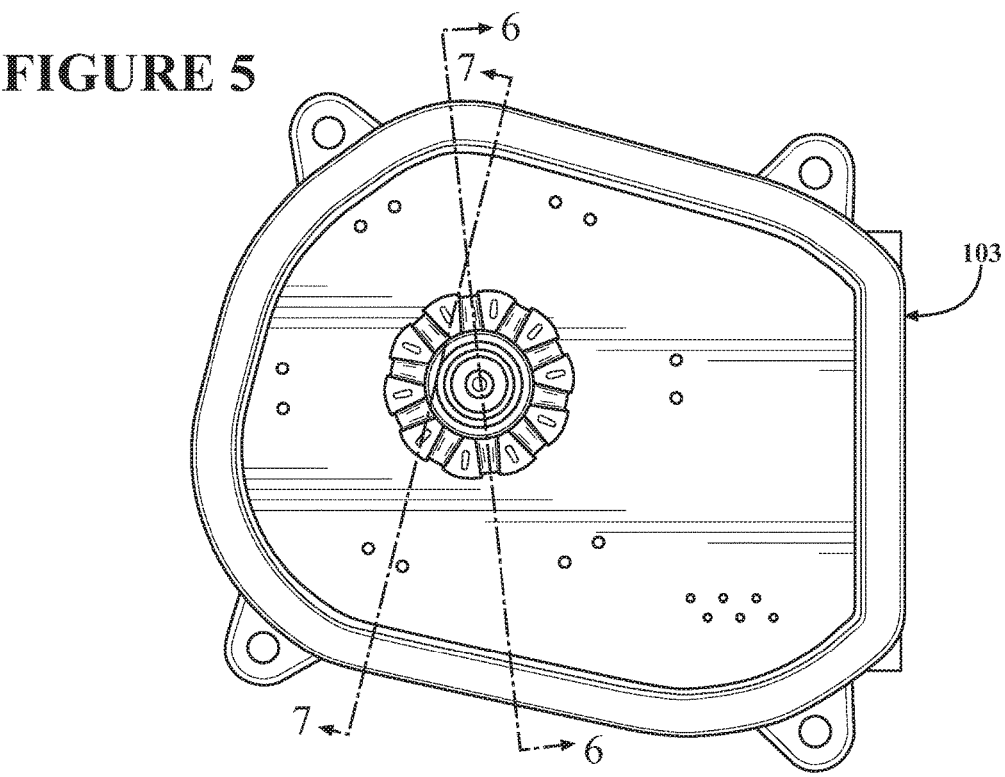
FIG. 5 shows a top plan view of an actuator having a housing removed to show the internal components in accordance with one embodiment of the present invention.

The electrical circuit 113, which may be connected to third housing 103, is configured to provide benefits and functional requirements related to the operation and position sensing of electrical drive device 106 and the driven member 119. For example, circuit 113 can provide for commutation of an electrical drive device 106 comprising a brushless D.C. (BLDC) motor. The construction of the BLDC motor has been previously described herein. Referring to FIG. 3, FIG. 5, and FIG. 6, the BLDC motor may be commutated by continuously switching the electrical control signal to the coils 112 to provide an electromagnetic field that may cause rotation of the rotor 114 and shaft 117. In accordance with one embodiment of the present invention sensors 133 are located on electric circuit 113 in proximity to permanent magnets 116 located on rotor 114. The sensors 133 can be a Hall Effect Device (HED), inductive sensor, magneto-resistive, or other suitable sensors for sensing the change of the magnetic field of permanent magnets 116.

The electrical control signal, applied to coils 112 produces an electromagnetic field that will attract or repel the permanent magnets 116 located on rotor 114 causing the rotor 114 to rotate. The sensors 133 detect a change in the magnetic field of the permanent magnet 116 and when a sufficient change is detected, the electric circuit 113 may switch the electrical control signal to another one of coils 112 to sustain rotation of rotor 114 and rotatable shaft 117.

In accordance with one aspect of the present invention sensing the change-in-state, or steps, of the magnetic field of the coils 112 using the sensors 133 and the permanent magnets 116 together create a first sensor 134 for sensing movement, lack of movement and position of the electrical drive device 106 and the predicted movement, lack of movement and position of the driven member 119 and the output element 130 that is connected to the mechanism 5.

Sensing the movement of the electrical drive device 106 may be accomplished by monitoring and recording the number of step changes of the magnetic field of the permanent magnets 116 on rotor 114. Since there are ten permanent magnets 116 and three sensors 133, there will be 30 steps recorded for each 360 degree rotation of rotor 114. One step would equal a movement of 360/30=12 degrees of rotation of rotor 114. The output of the first sensor 136 is referred to herein as a first sensor output value, which can be a single first sensor signal (e.g., a step) or a series of first sensor signals (e.g., multiple steps).

Sensing movement of the driven member 119 may be accomplished by using the mechanical advantage of the driven member 119 and determining the number of rotations the output element 130 will make versus the rotation of the rotor 114. For this example the driven member 119 will have a mechanical advantage of 50 to 1. This will require the rotor 114 to rotate 50 times for a single 360 degree rotation of the output element 130. To calculate the movement of the output element 130 for each step change of the rotor 114 you would determine the total number of step changes for 50 rotations of the rotor 114 and divide this into the 360 degree rotation of the output element 130. Therefore each 12 degree step change of the rotor 114 would equal a movement of (360/(30×50))=0.24 degrees of the output element 130. As previously stated herein, this type of position sensing is referred to as relative sensing and must have a reference position to record the number of step changes and determine the position of the output element 130.

In accordance with the present invention there can be several types of reference positions. In one embodiment the reference position is a hard stop at one end of the range of movement of the output element 130. The reference position can also be a position defined by a controlled device such as a turbocharger or a valve, or; it may be another reference such a programmed values contained in a look-up data table programmed onto the controller on the electrical circuit 113 or external controller 2 (shown in FIG. 1). Lost motion within the driven member 119 may result in movement of the electrical drive device 106 when the output element 130 is held in a fixed position. The movement of the electrical drive device 106 will continue until the yielding, looseness, and clearances within driven member 119 have been overcome. Likewise there may be forced movement of the output element 130 prior to movement of the electrical drive device 106 until the yielding, looseness and clearances within driven member 119 have been overcome.

FIG. 7 shows a cross section of actuator 100 and a second sensor 137 for directly sensing the position of the output element 130 to determine actual position of the output element 130. As previously stated this type of sensor is referred to as an absolute position sensor. Second sensor 137 includes a permanent magnet 138, attached to the output element 130, and a sensor 139 located on electrical circuit 113 in proximity to the permanent magnet 138. Sensor 139 may be may be a Hall Effect Device (HED), inductive sensor, magneto-resistive, or other suitable sensor for sensing the change of the magnetic field of permanent magnet 138. Sensor 139 may detect a variable change in the magnetic field, of permanent magnet 138, which may indicate the actual position of the output element 130.

The output of sensor 139 is referred to herein as a second sensor output value, which can be a single second sensor signal or a series of second sensor signals. In one embodiment of the invention the second sensor output value is a variable output voltage ranging from 0.0 VDC to 5.0 VDC or it may be a digital output. If the output is an analog voltage, the electrical circuit 113 may include an analog to digital (A/D) converter to process the analog voltage input from sensor 139 and convert it to a digital value used within the electrical circuit 113 to determine the actual position of output element 130. The second position sensor 137 may be calibrated so that a first end of the range of movement of the output element 130 may represent a lower voltage and a second end of the range of movement of output element 130 may represent a high voltage. A position between the first and second ends of the range of movement of output element 130 may be determined by the increment or the difference between the low and high voltage. For example, the lowest range of movement may be 0.0 degrees and the second position sensor 137 may be programmed for 0.0 VDC, and; the highest range of movement of output element 130 may be 90.0 degrees and the second position sensor 137 may be programmed for 5.0 VDC. Each degree of rotation would be determined by dividing the total range of voltage, 5.0 VDC, by the total range of movement of the output element 130 and would equal (5.0/90)=0.05555 VDC/degree. Therefore if the second position sensor 137 had an output voltage of 2.0 VDC, the output element 130 position would be equal to (2.0/0.05555)=36.0 degrees.

FIG. 7 also shows two alternate positions for the second sensor, which does not necessarily have to be connected to the output element 130. Instead the second sensor can be connected to any one of the other gears. As shown in FIG. 7 a second sensor 137' is connected to the fourth gear 123 and a second sensor 137" is connected to the third gear 122. However, it is within the scope of this invention for the second sensor to be connected to any one of the gears of the driven member 119, which could also give or provide an actual position sensor signal that can be used to determined lost motion of the actuator 100.

The absolute sensor provides the actual position of the output element 130 but, by itself, it cannot determine if the electrical drive device 106 is moving or stationary, however, the application of the two position sensors 134, 137 provides a method for determining a characteristic of the actuator that cannot be determined by a single position sensor. More specifically the method may determine the lost motion of the actuator or system as well as other characteristics.

As previously stated herein, lost motion is the lag between the motion of the electrical drive device 106 or motor and the driven member 119, or output of the actuator (i.e., output element 130) that connects to the mechanism 5, due to yielding or looseness between all the components of the actuator, including the driven member 119. FIG. 4 shows lost motion between second gear 121, third gear 122 and fourth gear 124. The lost motion may result from clearance between components within driven member 119 and include clearances between the gears 120, 121, 122, and 123 of the driven member 119. The lost motion of an actuator increases as components wear and eventually degrades the function of the actuator and/or system.

The lost motion may in part be determined by monitoring a position or range of position of output element 130 or actuator 100. The position or range of position may be measured at one commanded position of the output element 130 or it may be measured between two or more commanded positions of the output element 130. The range of position may be defined as the difference between a maximum and minimum position. For example, if the maximum sensed position is 45 degrees and the minimum sensed position is 43 degrees, the range of position would be (45−43)=2 degrees.

Figure 8:
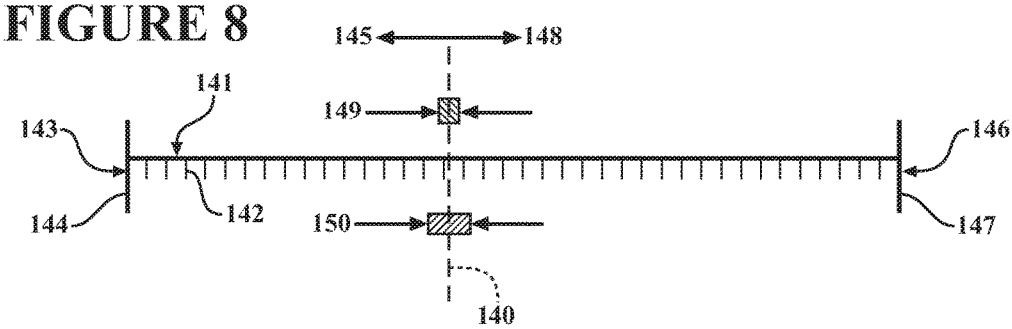
FIG. 8 shows a graphic representation of the actuator and method for determining a characteristic in accordance with one embodiment of the present invention.

Referring to FIGS. 5, 6, 7, and 8, the lost motion may be determined by a range of position measured at one commanded position 140 of the output element 130. FIG. 8 shows a graphic representation of the movement and position of output element 130, with the position of the output element 130 being graphically represented as the line 140. The scale 141 shows a measure of movement and position of output element 130. The increments 142 are any suitable increment used to measure movement and position of output element 130 such as degrees, radians, inches or millimeters. The increments 142 can also represent the step change indicating movement of the electrical drive device 106 and the output element 130. The output element 130 movement may also be rotary or linear as previously described herein. A first end 143 of the scale 141 shows a first limit 144 for output element 130 movement in a first direction 145, and; a second end 146 of the scale 141 shows a second limit 147 for output element 130 movement in a second direction 148. First and second limits 144, 147 may be physical stops in the actuator 100, output element 130, mechanism 5 or the controlled device.

During operation an electrical control signal is provided to the electrical drive device 106 to position the driven member 119 and output element 130 at the one commanded position 140. The first sensor 134 output will be monitored to confirm the electrical drive device 106 is controlling the output element 130 position within a first range of position 149 that will hold the driven member 119 and output element 130 within a suitable range of the single commanded position 140. The first range of position 149 will have a value of zero if no movement of the electrical drive device 106 is sensed by first sensor 134, which indicates no movement of the output element 130. Internal and external forces may be applied directly or indirectly to output element 130, or; a mechanism or controlled device operably connected to output element 130. The lost motion of the driven member 119 may allow the output element 130 to move in either of the first or second direction 145, 148 without moving the electrical drive device 106 as confirmed by the first sensor 134. The internal and external forces include, but are not limited to, a spring force, intake boost pressure, exhaust gas pressure, exhaust gas pulsations, vibration, physical shock or other internal or external forces. The output of the second position sensor 137 indicates a second range of position 150, of the output element 130, which is caused by the lost motion of the driven member 119. The second range of position 150 has a value of zero if no movement of the output element 130 is sensed by second sensor 137. The difference between first range of position 149 of output element 130, measured by first sensor 134, and the second range of position 150 of output element 130 measured by the second position sensor 137, is the lost motion of the driven member 119, where lost motion is being detected.

Figure 9:
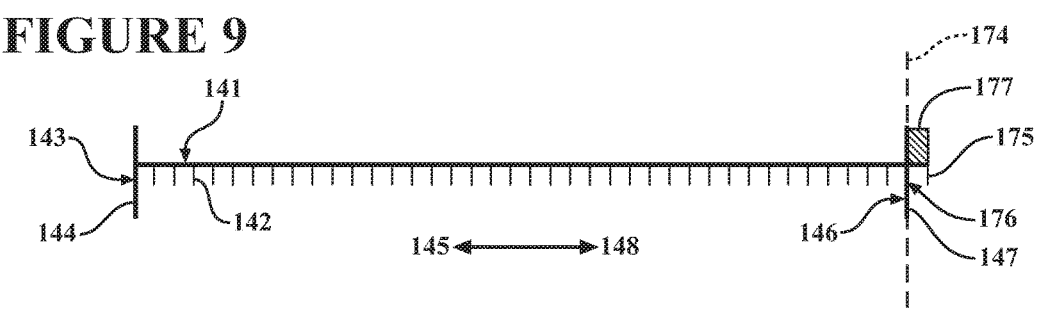
FIG. 9 shows a graphic representation of the actuator and method for determining a characteristic in accordance with one embodiment of the present invention.

Referring to FIGS. 5, 6, 7, and 9, the lost motion is also determined by a position measured by the first and second positions sensor 134, 137 at one commanded position 174 of the output element 130. In this embodiment of the invention the commanded position 174 is the second physical limit 147 for limiting output element 130 movement in the second direction 148. FIG. 9 is similar to FIG. 8 and shows a graphic representation of the movement and position of output element 130 as measured by first and second position sensors 134, 137. This embodiment of the method requires an electrical control signal to force movement of the electrical drive device 106 to position the driven member 119 and output element 130 at the one commanded position 174. When second limit 147 is contacted at the one commanded position 174, the output element 130 can no longer move and the output of the second position sensor 137 may no longer change, however, the lost motion of the driven member 119 may allow the electrical drive device 106 to continue moving until looseness or clearances of the driven member 119 have been overcome. When electrical device 106 no longer moves the output of the first sensor will no longer change. The output of the first sensor will indicate a first position 175 of output element 130 and; the output of the second sensor 137 will indicate a second position 176 for the output element 130. In this particular embodiment of the invention the difference 177 between the first position 175 and second position 176 is the lost motion of driven member 119.

Figure 10:
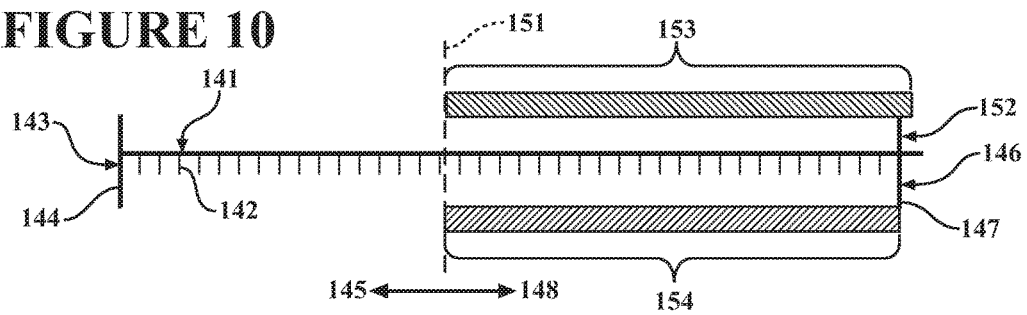
FIG. 10 shows a graphic representation of the actuator and method for determining a characteristic in accordance with one embodiment of the present invention.

Referring to FIGS. 5, 6, 7, and 10, the lost motion is also determined by a range of position measured between two more positions of the total range of movement of the output element 130 including the first and second limits 144, 147 which define the limit of travel of output element 130. FIG. 10 is similar to FIG. 8 and shows a graphic representation of the movement and position of output element 130 as measured by first and second position sensors 134, 137. This method requires an electrical control signal to force movement of the electrical drive device 106 to position the driven member 119 and output element 130 at a first and second commanded positions 151 and 152. The output of the first position sensor 134 indicates a first range of position 153 of output element 130 between the first and second commanded positions 151, 152. The output of the second position sensor 137 indicates a second range of position 154 of the output element 130 between the first and second commanded positions 151, 152. The second commanded position 152 can be a physical stop within the actuator 100 defining maximum or minimum range of movement of the output element 130. When the physical stop is contacted at the second commanded position 152, the output element 130 can no longer move and the output of the second position sensor 137 no longer changes, however, the lost motion of the driven member 119 allows the electrical drive device 106 to continue moving until looseness or clearances of the driven member 119 have been overcome. The additional movement will be measured by the first position sensor 134 and will include the lost motion of the driven member 119. The difference between first range of position 153 of the output element 130, measured by first sensor 134, and; the second range of position 154 of the output element 130, measured by the second position sensor 137, is the lost motion of the driven member 119.

Figure 15:
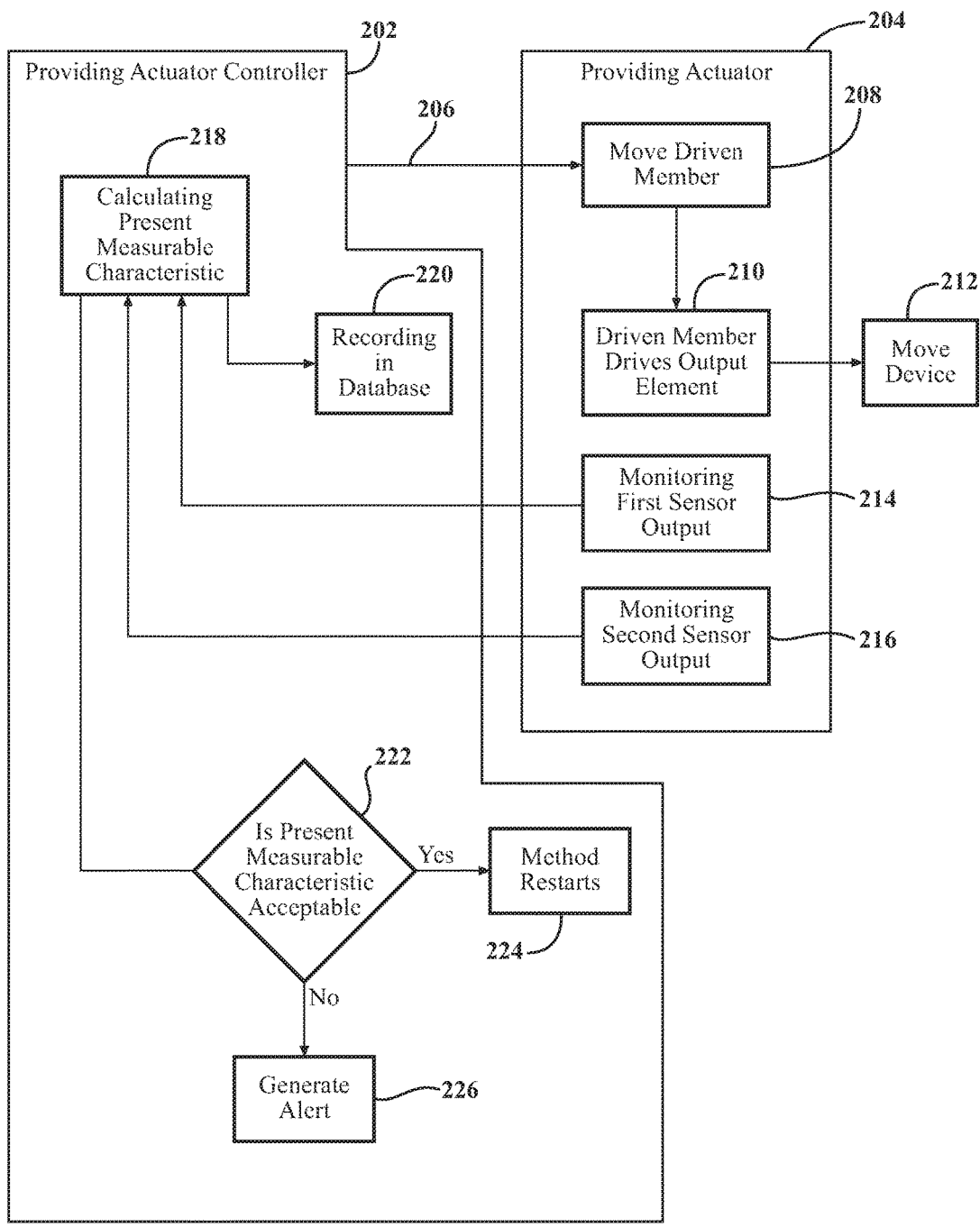
FIG. 15 shows a schematic flow chart of the method according to one embodiment of the invention.

The preceding embodiments and descriptions for determining the lost motion of the actuator 100 use a method 200 that may include many steps as outlined in FIG. 15 with components shown in FIGS. 1-7. At a step 202 there is provided a controller that is part of an actuator 100 or separate therefrom. At step 204 of providing the actuator 100 having an electrical drive device 106 for providing a moveable force output of the electrical drive device 106. The actuator 100 further includes the driven member 119 and the output element 130, for receiving the moveable force and translating the moveable force in a manner that will position the output element 130. The actuator further includes the first position sensor 134 for sensing movement, lack of movement, and position of the electrical drive device 106, the driven member 119, and the output element 130 and the second position sensor 137 for sensing movement, lack of movement, and position of the driven member 119 and the output element 130.

Next the method includes a step 206 of providing an electrical control signal commanding the actuator with the controller to activate the electrical drive device 106 to drive and maintain the output element 130 to at least one commanded position. At step 208 the electrical drive device moves the driven member 119 and at step 210 the driven member drives the output element 130 to one or more commanded positions 140, 151, 152, 174 within a total range of movement of the output element 130, which at step 212 the force or movement of the output element 130 is translated to and move the mechanism 5 or controlled device.

At step 214 the method further includes monitoring the output of the first position sensor 134 at the one or more commanded positions 140, 151, 152, 174 of the output element 130, and; determining a first position or first range of position 149, 153, 175 of the output element 130 at the one or more commanded positions 140, 151, 152, 174. The step 214 also includes generating the at least one first sensor output value to the controller.

At step 216 the method further includes monitoring the output of the second position sensor 137 at the one or more commanded positions 140, 151, 152, 174 of the output element 130, and; determining a second position or second range of position 150, 154, 176 of the output element 130 at the one or more commanded positions 140, 151, 152, 174. The step 216 also includes generating the at least second sensor output value to the controller.

At step 218 the method further includes calculating at least one present measurable characteristic in the controller by calculating or comparing the values of the first position or first range of position 149, 153, 175 and the second position or second range of position 150, 154, 176 of the output element 130 at the one or more one commanded positions 140, 151, 152, 174. The difference between the first position or first range of position 149, 153, 175 and second position or second range of position 150, 154, 176 of the output element 130, at the one or more commanded positions 140, 151, 152, 174 of the output element 130 indicate a value for lost motion of the driven member 119 of the actuator 100. At step 220 the at least one present measurable characteristic value is recorded in a database that resides or is connected to the controller. It may also be appreciated that the characteristic may also indicate lost motion by conditions such as looseness between shaft 117 and the rotor 114, looseness between output element 130 and drive gear 123 such conditions might result from assembly defects or damage sustained during operation of the actuator and/or controlled device.

The method for determining the lost motion of the actuator 100 also includes an additional step 222 of performing a performance determination by comparing the at least one present measureable characteristic for lost motion to a reference value to determine if the lost motion is acceptable or unacceptable. If the value is acceptable then at step 224 the method restarts. If the value at step 222 is unacceptable then at step 226 an alert is generated. The alert can be a signal to the driver or an alert generated to a remote vehicle status monitoring system. At step 222 the step can also include comparing the value for lost motion to a reference value for lost motion and when the value for lost motion is less than the reference value, the lost motion of the driven member 119 of the actuator 100 may be acceptable. Also when the value for lost motion is greater than the reference value, the lost motion of the driven member 119 of the actuator 100 is unacceptable.

The duration over which the lost motion may be determined may vary depending on the operating conditions of the system. For example, the duration may be one second or less if positioning of the output element 130 must frequently change to provide the desired operation of the system. However, during steady-state conditions, the position of the output element 130 may not require change for several seconds. During a steady state condition and constant commanded position of the output element 130, the maximum variation in the position may be measured as the external factors, previously mentioned herein, act on output element 130. It may therefore be beneficial to extend the time over which the position of output element 130 is measured.

In a further embodiment of the invention the method includes determining the rate at which the lost motion is changing over an interval at step 222. The ability to determine the lost motion and the rate at which lost motion changes is useful for identifying an immediate or future issue with the actuator 100 and/or system. The method for determining the rate of change of lost motion of the actuator 100 includes determining at least a first and second value for the lost motion of the actuator 100 during at least one interval. Then determining the difference between the first and second values of the lost motion of the actuator 100 determined during the at least one interval. The difference between the first and second value of the lost motion determined during the at least one interval may be used to determine the rate of change of the lost motion of the actuator 100 over the at least one interval.

In a further embodiment of the invention the method for determining the rate of change of lost motion of the actuator 100 includes the further step of comparing the determined rate of change of lost motion to a reference value for the rate of change of lost motion to determine if the rate of change may be acceptable or unacceptable. An acceptable rate of change may indicate the driven member 119 of the actuator 100 may not exceed the reference level for acceptable lost motion over a projected interval. An unacceptable rate of change may indicate the driven member 119 of the actuator 100 may exceed the reference level for acceptable lost motion over a projected interval. The method according to this particular determination method further includes comparing the determined rate of change of lost motion for the driven member 119 of the actuator 100 to a to a reference value for rate of change of lost motion. If the difference between the determined value for rate of change of lost motion is less than the reference value, the rate of change of lost motion of the actuator 100 may be acceptable. If the difference between the determined rate of change of lost motion is greater than the reference value, the rate of change of lost motion of the actuator 100 is unacceptable.

In a further embodiment of the invention the interval between determining the lost motion of the driven member 119 of the actuator 100 is lapsed time between monitoring both outputs of the first and second position sensors 134, 137. It may also be an event including but not limited to; a key-on, key-off, power on, power off, first position sensor output, second position sensor output, a predetermined difference between the first a second position sensor, an input from another sensor or a combination thereof.

Figure 11:
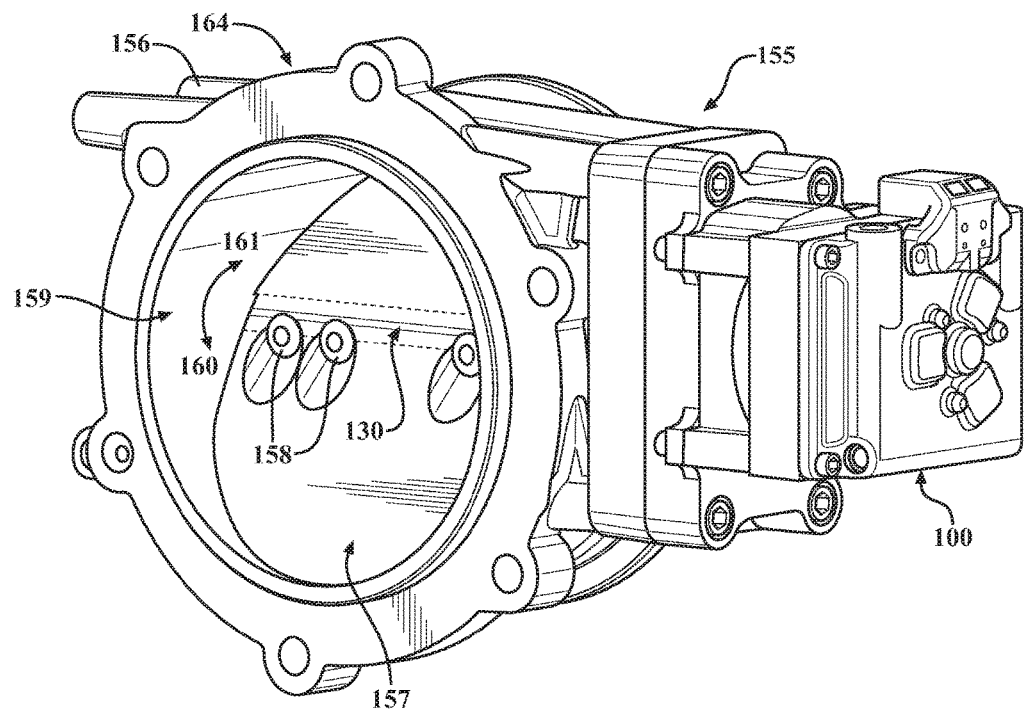
FIG. 11 shows a three dimensional perspective view of an actuator and valve in accordance with one embodiment of the present invention.

The invention may also be applied to a complete system including an actuator and controlled device such as the variable vanes of a turbocharger or the valve plate of a valve. FIG. 11 shows a system 155 comprising an actuator 100 and a valve 164. For this exemplary embodiment, the actuator will be similar to actuator 100 therefore similar numbers will be used to identify similar items. Actuator 100 uses a brushless D.C. motor as its electrical drive device 106, and; the multi gear driven member 119 including an output element 130 operably connected to one of the gears of the driven member 119. The first and second position sensors 134, 137 will also be similar to actuator 100 and will monitor the movement and position of the electrical drive device 106 the driven member 119, and output element 130. The actuator 100 is connected the valve 164. The valve 164 includes a valve housing 156. The output element 130, shown as hidden lines, extending into valve housing 156 and may be operably connected to a valve plate 157 by fasteners 158. The output element 130 may be rotatably coupled to the valve housing 156 to provide for rotation of a valve plate 157 within a bore 159 of valve housing 156. The actuator 100 may rotatably position the valve plate 157 between a closed and open position to control fluid flow through the bore 159 of valve housing 156.

The actuator 100 and valve 164 of the system 155 function in the following manner. An electrical control signal is provided to the electrical drive device 106 of actuator 100 and translated to the driven member 119 and the output element 130 of actuator 100 as previously described herein. The valve plate 157, operably connected to the valve output element 130, rotates within the bore 159 of valve housing 156. The direction of rotation of valve plate 157 is dependent upon the polarity of the electrical control signal applied to the electrical device 106 of actuator 100. A first polarity may force the electrical drive device 106 of actuator 100 to force rotation of the valve output element 130 and valve plate 157 in a first closing direction 160 and; a second polarity may force the electrical drive device 106 of actuator 100 to force rotation of the valve output element 130 and valve plate 157 in a second opening direction 161.

Figure 12:
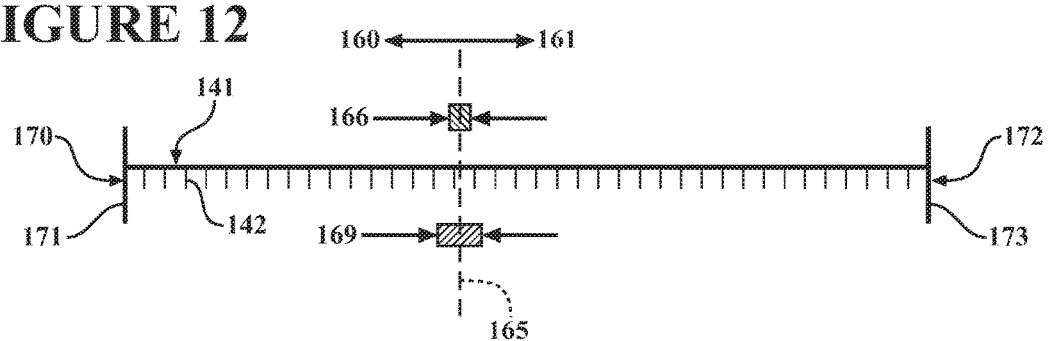
FIG. 12 shows a graphic representation of the actuator and method for determining a characteristic in accordance with one embodiment of the present invention.

The actuator 100 and valve 164 of the system 155 has similar issues with lost motion as previously described herein. FIG. 12 shows a graphic representation of the movement of output element 130 and valve plate 157 as measured by first and second position sensors 134, 137. FIG. 12 is similar to FIG. 8. Scale 141 and shows movement of output element 130 and valve plate 157. The increments 142 are any suitable increment used to measure shaft movement as previously described herein. A first end 170 of the scale 141 shows a first limit 171 for movement of output element 130 and valve plate 157 in a first closing direction 160, and; a second end 172 of the scale 141 shows a second limit 173 for movement of output element 130 and valve plate 157 in a second valve opening direction 161. First limit 171 is a physical stop in the valve 164 such as the valve plate 157 contacting the bore 159 in valve housing 156. Second limit 173 is a physical stop of actuator 100 that may limit the maximum opening position of valve plate 157 within the bore 159 of the valve housing 156.

Referring to FIGS. 11 and 12, an electrical control signal is provided to the electrical drive device 106, of actuator 100, to position the driven member 119, the output element 130, and the valve plate 157 of the valve 164 at one or more commanded positions 165. The first position sensor 134 output will confirm the electrical drive device 106 is within a first position or range of position 166 that will hold the driven member 119, the output element 130, and valve plate 157 within a suitable range of the one or more commanded positions 165. The first position or range of position 166 can have a value of zero if no movement of the electrical drive device 106 is sensed by first position sensor 134. Internal and external forces can be applied directly or indirectly to output element 130 and valve plate 157 of valve 164 and; the lost motion of the driven member 119 may allow the output element 130 and valve plate 157 to move in either of the first or second direction 160, 161 without moving the electrical drive device 106 as confirmed by the first sensor 134. The internal and external forces include, but are not limited to; a spring force, exhaust gas pressure, exhaust gas pulsations, vibration, physical shock or other internal or external forces. The output of the second position sensor 137 can indicate a second position or range of position 169 allowed by the lost motion of the drive device 119. The difference between first position or range of position range 166, measured by the first position sensor 134, and; the second position or range of position 169, measured by the second position sensor 137, is the lost motion of the driven member 119.

The preceding embodiment and description of determining the lost motion of a system 155 uses a method that may include the steps of providing the actuator 100 for use on an engine. There is also an actuator having the electrical drive device 106 for providing a moveable force, the driven member 119, including the output element 130, for receiving the moveable force and translating the force to position the output element 130. The method further includes providing the first position sensor 134 for sensing movement, lack of movement, and position of the electrical drive device 106, the driven member 119, and the output element 130. The second position sensor 137 is provided for sensing movement, lack of movement, and position of the driven member 119 and the output element 130. Also provided is a controlled device 157, 164 that is operably connected to and positioned by the output element 130 of the driven member 119, The method next includes providing an electrical control signal to the electrical drive device 106 to force movement of the electrical drive device 106 to move the driven member 119, the output element 130, and the controlled device 157, 164 to one or more commanded position 165 within a range of movement of the output element 130 and the controlled device 157, 164. Then the step of monitoring the output of the first position sensor 134 at the one or more commanded positions 165 and determining a first position or range of position 166 of the electrical drive device 106, and the controlled device 157, 164. Then the step of monitoring the output of the second position sensor 137 at the one or more commanded positions 165 and the step of determining a second position or range of position 169 of the output element 130 and the controlled device 157, 164.

Next the method includes the step of comparing the values of the first position or range of position 166 and the second position or range of position 169, wherein, the difference between the first position or range of position 166 and the second position or range of position 169 indicates the lost motion of the actuator 100 within system 155. The foregoing exemplary embodiment of a system 155 included and actuator 100 and a valve 164. It is also within the scope of the invention that the system may include other controlled devices such as the variable vanes of a turbocharger, a poppet valve, or a swing valve.

Figure 13:
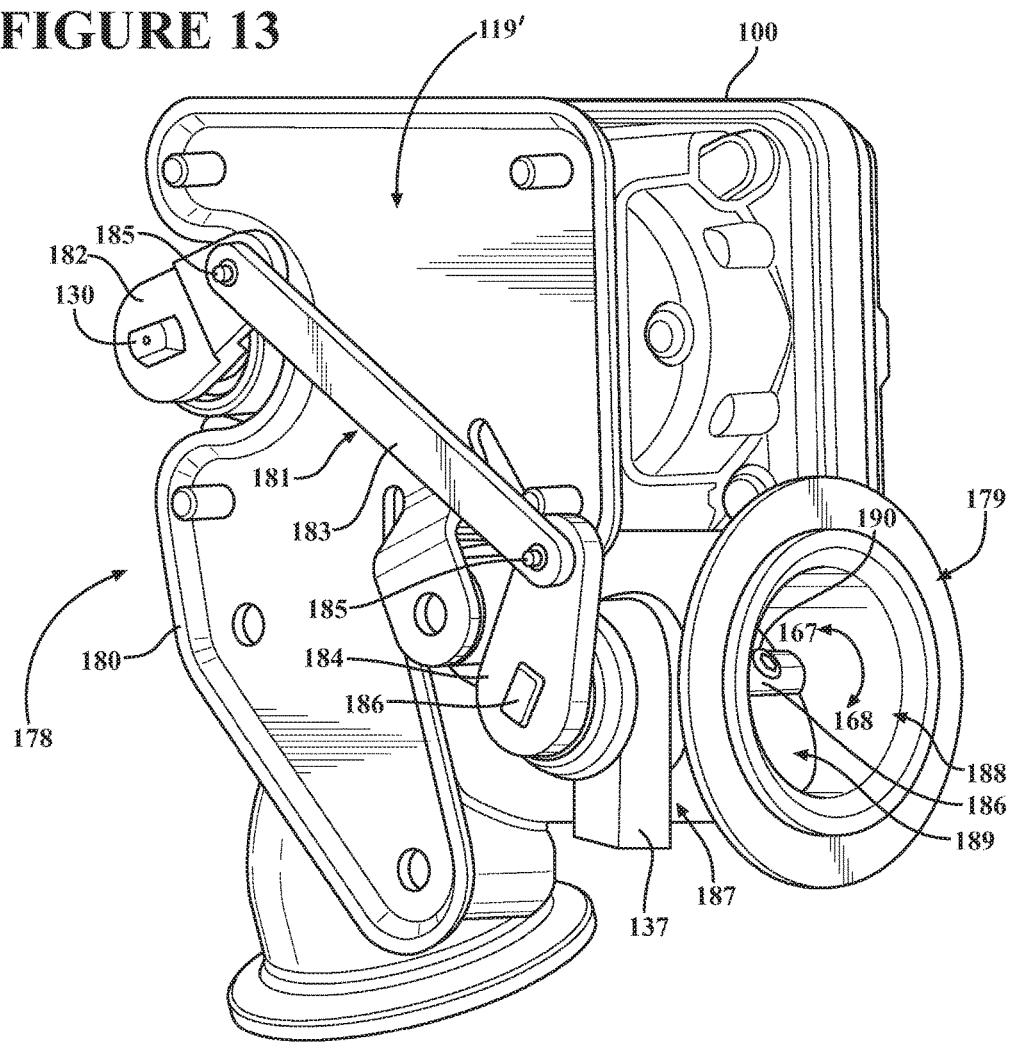
FIG. 13 shows a three dimensional perspective view of an actuator and valve in accordance with one embodiment of the present invention.

Another embodiment of a system 178, shown in FIG. 13, includes a separate actuator 100 and a separate controlled device 179 mounted to a bracket 180. The controlled device 179 is a valve similar in function to valve 164 (shown in FIG. 11). The actuator 100 and valve 164 are connected by a linkage 181 with a first lever 182, and link bar 183 and a second lever 184. The output element 130, first lever 182, 183, link bar second lever 184, form a portion of driven member 119' that is external to the actuator. The first lever 182 is attached to the output element 130 which extends from actuator 100. The link bar 183 is rotatably coupled to the first and second levers 182, 184 by pins 185. Second lever 184 is operably connected to a valve shaft 186 which is rotatably coupled to a valve housing 187. Housing 187 includes a bore 188 for receiving and delivering a fluid flow. A valve plate 189 is located within the bore 188 and is operably connected to the valve shaft 186 by fasteners 190. The valve plate 189 is rotatable with valve shaft 186 within the bore 188. The valve plate 189 rotates in a valve closed direction 168 and valve open position 167 to control the fluid flow through the bore 188. The second position sensor 137 has been moved so that it monitors the position of valve shaft 186 and valve plate 189.

The actuator 100 and valve 179 of the valve system 178 function in the following manner. An electrical control signal is provided to the electrical drive device 106 of actuator 100 and is translated to the output element 130 of actuator 100 as previously described herein. The rotatable force is further translated to the valve shaft 186 by linkage 181 which includes first lever 182, link bar 183, and second lever 184. The valve plate 189 is operably connected to the valve shaft 186 to rotate within the bore 188 of valve housing 186. The direction of rotation of valve plate 189 depends upon the polarity of the electrical control signal applied to the electrical drive device 106 of actuator 100. For example, a first polarity may force the electrical drive device 106 of actuator 100 to force rotation of the output element 130, linkage 181, valve shaft 186 and valve plate 189 in a first closing direction 168 and; a second polarity may force the electrical drive device 106 of actuator 100 to force rotation of the output element 130, linkage 181, valve shaft 186 and valve plate 189 in a second opening direction 167. The range of valve plate 189 rotation in the first closing direction 168 may be limited by the contact of the valve plate 189 with the bore 188 of valve housing 187. The range of valve plate 189 rotation in the second opening direction 167 may be limited by a physical stop of in the actuator 100.

The actuator 100 and valve 179 of the system 178 may have similar issues with lost motion as actuator 100 and valve 164 of system 155 as previously described herein, and; can also experience some additional lost motion attributed to the linkage 181. The lost motion of the driven member 119 and linkage 181 can be determined using the method for determining lost motion for system 155 previously described herein. The method used the output of the first and second sensors 134, 137 to determine a value for lost motion.

The method and exemplary embodiments describe herein were used to determine the characteristic of lost motion for the actuator system. It is also within the scope of the invention to determine other characteristics that may be determined by comparing the output of the first and second position sensors 134, 137. A second characteristic may be wear of the valve plate caused by repeated contact with the valve bore. The wear may change the position of the valve plate as measured by the position sensors 134, 137. A third characteristic may be wear of the variable vanes of a turbocharger causing change to its position. The aforementioned second and third characteristics of wear of the valve plate or wear of the variable vanes of a turbocharger may also be considered additional lost motion, measurable by the method of the invention.

In the foregoing exemplary embodiments and description, a magnetic field of a permanent magnet was used to detect movement and position of the electrical drive device 106. It may be appreciated by one having ordinary skill in the art that movement of the electrical drive device 106 can be detected by sensing another parameter such as; electrical current, voltage, counter electromagnetic force (cemf), or another parameter. Therefore it also within the scope of the invention that another parameter can be used to sense movement and/or position of the electrical drive device 106.

Figure 16:
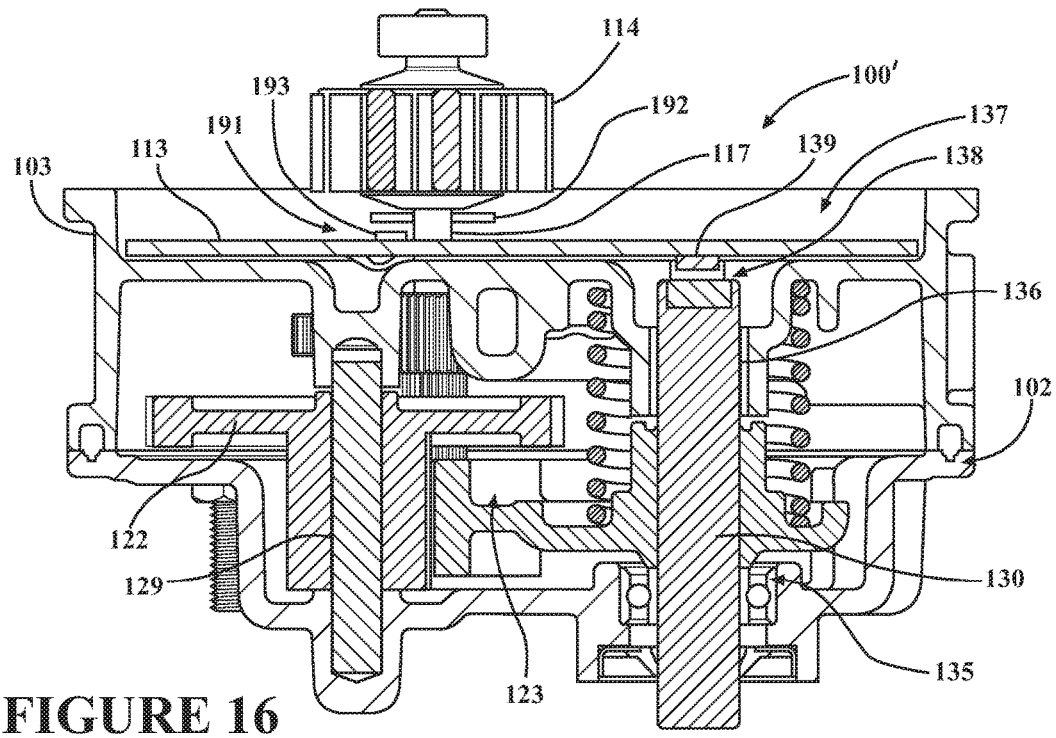
FIG. 16 shows a side cross-sectional plan view in accordance with another embodiment of the invention.

For the present embodiment of the invention, a difference between outputs of the first and second position sensors 134, 137 was used to determine the characteristic of actuator 100 as shown in FIG. 7. It is also within the scope of the invention to use other sensors, and sensors locations. For example, FIG. 16, which is similar to FIG. 7, shows an alternative embodiment for an actuator 100' with an alternate first sensor 191. Alternate first sensor 191 may comprise a ring magnet 192 that may be coaxial with shaft 117. Ring magnet may be attached to the shaft 117 by means such as press fit, adhesive, or other suitable means. At least one sensor 193 may be electrically connected to the circuit 113 and it may provide an output signal to circuit 113 indicating movement, lack of movement, and position of the shaft 117 and rotor 114. The ring magnet 192 may comprise several alternating magnetic poles and the transition or switching of the poles may be sensed as they pass the sensor 193. The switching events may be used for position sensing in a similar manner used for the first position sensor 134 as previously described herein. Alternatively the ring magnet 191 may have a field strength that increases or decreases as the shaft 117 and rotor 114 rotate. The change of magnetic field intensity may be sensed by sensor 193 and the sensor 193 may provide an output value that may indicate the movement, lack of movement and position of the shaft 117 and rotor 114. The difference between the output of the alternate first sensor 191 and the output of the second senor 137 may be used to determine the characteristic of the actuator 100', which may be lost motion.

The alternate first position sensor 191 may provide acceptable results for determining the characteristic of the actuator 100' but it may have some limitations. For the exemplary embodiment shown in FIG. 16, alternate first sensor 191 may only directly measure movement of the shaft 117 and may not directly measure additional movement of the rotor 114 that may result from the connection between shaft 117 and rotor 114. The connection between rotor 114 and the shaft 117 may be a press fit, threaded connection, a weld, or other suitable connection. The connection may have yielding or looseness that may be caused by misassembly, wear, stress, vibration, or other factors. Since the alternate first position sensor 191 is only directly measuring the position of the shaft 117, the output of the alternate first senor 191 will not include the additional movement of rotor 114 caused by the yielding or looseness of the connection between the shaft 117 and rotor 114, and; the characteristic of the actuator determined by the difference of the outputs of the alternate first sensor 191 and the second sensor 137 will not include this additional movement. The alternative embodiment of FIG. 16, using alternate first sensor 191, is in contrast to the embodiment of FIG. 7 wherein the first position sensor 134 directly senses movement, lack of movement, and position of the rotor 114, and the difference between the outputs of first sensor 134 and second sensor 137 determine the characteristic of the actuator which includes the yielding and looseness of the connection between the shaft 117 and the rotor 114. The decision to use a specific type of sensor and sensor location may be dependent upon packaging, accuracy, reliability, durability, cost, or other factors.

It is also within the scope of the invention to determine lost motion of actuators providing both rotary and linear motion. Actuator 100 described herein provided a rotary output via driven member 119 including output element 130. Actuators having a linear output can have a mechanism for converting rotary to linear motion. A common mechanism such as a scotch yoke may be used for such a conversion. Another mechanism for converting rotary to linear motion may use a cam slot bearing drive mechanism as described in U.S. Pat. No. 8,803,388, which is hereby expressly incorporated by reference.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of determining a characteristic of an actuator comprising the steps of:
    providing an actuator including an electrical drive device connected to a power source and a rotor and shaft rotatably positioned within the electrical drive device to rotate in response to an electrical input that energizes the electrical drive device, wherein the rotation of the rotor generates a moveable force output of the electrical drive device, an output element connected to a controlled device, a driven member connected between the electrical drive device and the output element wherein the driven member receives the moveable force output of the electrical drive device and transfers at least a portion of the moveable force output to the output element;
    providing a first position sensor for sensing movement, lack of movement and position of the electrical drive device, driven member and output element which is communicated by the first sensor as at least one first sensor output value;
    providing a second position sensor for sensing movement, lack of movement and position of the driven member and the output element which is conveyed by the second sensor as at least one second sensor output value;
    providing a controller connected to the actuator or separate from the actuator wherein the controller is configured to receive the at least one first sensor output value and the at least one second sensor output value;
    commanding the actuator with the controller to energize the electrical drive device to drive and maintain the output element to at least one commanded position;
    generating the at least one first sensor output value from the first sensor and transmitting the at least one first sensor output value to the controller;
    generating the at least one second sensor output value from the second sensor and transmitting the at least one second sensor output value to the controller;
    calculating at least one present measurable characteristic in the controller by calculating the difference between the at least one first sensor output value and the at least one second sensor output value, and
    determining if the at least one present measurable characteristic is acceptable or unacceptable.

2. The method of claim 1 wherein the at least one present measurable characteristic is a lost motion of the actuator, which is the lag between the motion of the motion of the electrical drive device and the output element.

3. The method of claim 1 wherein the step of determining if the at least one present measurable characteristic is acceptable or unacceptable further includes the step of comparing the at least one measurable characteristic with one or more reference values previously recorded in the database, wherein when the at least one present measurable characteristic is less than the one or more references values the at least one present measurable characteristic is acceptable and when the at least one present measurable characteristic is greater than the reference value, the at least one present measurable characteristic is unacceptable.

4. The method of claim 1 further comprising the step of providing at least one physical stop of the driven member or output element for defining a position or range of position of the driven member or output element upon the driven member or output element contacting the at least one physical stop and the at least one present measurable characteristic is calculated in part using the at least one physical stop of the driven member or output element.

5. The actuator of claim 1, wherein the at least one first sensor output value and the at least one second sensor output value are measured over at least one interval and the at least one present measurable characteristic is determined for the at least one interval and indicates a rate of change of the at least one present measurable characteristic during the at least one interval.

6. The actuator of claim 5 wherein the at least one interval is lapsed time or engine hours between monitoring the outputs of the at least one first sensor output value and the at least one second sensor output value.

7. The method for determining a characteristic of an actuator of claim 5 wherein the at least one interval is determined by one of the group consisting of a key-on, a key-off, engine power on, engine power off, at least one first sensor output value, at least one second sensor output value, a predetermined difference between the at least one first sensor output value and the at least one second sensor output value, an input from another sensor and combinations thereof.

8. The method for determining a characteristic of an actuator of claim 5 further comprising the steps of:
comparing the rate of change of the characteristic to a reference value for rate of change of the characteristic, wherein when the difference between rate of the characteristic is less than the reference value, the rate of change of the characteristic is acceptable, and when the difference between rate of change of the characteristic is greater than the reference value, the rate of change of characteristic is unacceptable.

9. The method for determining a characteristic of an actuator of claim 1 wherein the first position sensor and second position sensor are one of an absolute position sensor or a relative position sensor.

10. The method for determining a characteristic of an actuator of claim 1 wherein the driven member includes the output element, a plurality of engaged gears, a linkage, a plurality of gears and chains, a plurality of gears and drive belts, a plurality of pulleys and drive belts, shafts and a combination thereof.

11. The method for determining a characteristic of an actuator of claim 1 wherein the electrical drive device further comprises a stator having at least two coils connected to the power source and the rotor is rotatably positioned within the stator to rotate in response an electrical input that energizes the coils, wherein the rotation of the rotor generates the moveable force output of the electrical drive device.

12. The method for determining a characteristic of an actuator of claim 1 wherein the first position sensor at least in part controls the commutation of the rotor.

13. The method for determining a characteristic of an actuator of claim 1 wherein at least one component of the first position sensor is an integral part of the electrical drive device, and; wherein the one component is a permanent magnet attached to the rotor.

14. The method for determining a characteristic of an actuator of claim 1 wherein the first position sensor directly senses the movement, lack of movement, and position of the rotor, and wherein the shaft is connected to-and is rotatable with the rotor, and; wherein the calculated at least one present measurable characteristic includes any additional movement between the rotor and the shaft.

15. The method for determining a characteristic of an actuator of claim 1 wherein the first position sensor directly senses the movement, lack of movement, and position of the shaft, and wherein the shaft is connected to-and is rotatable with the rotor, and; wherein the calculated at least one present measurable characteristic does not included any additional movement between the rotor and the shaft.

16. An actuator for use on an engine having a monitoring arrangement for monitoring a characteristic of the actuator comprising:
an electrical drive device connected to a power source and a rotor and shaft rotatably positioned within the electrical device to rotate in response an electrical input that energizes the electrical drive device, wherein the rotation of the rotor generates a moveable force output of the electrical drive device;
an output element;
a driven member connected between the electrical drive device and the output element wherein the driven member receives the moveable force output of the electrical drive device and transfers at least a portion of the moveable force output to the output element;
a first position sensor in proximity to the electrical drive device for sensing movement, lack of movement and position of the electrical drive device, driven member and output element and generating at least one first sensor output value;
a second position sensor located in proximity to the driven member or output element for sensing movement, lack of movement and position of the driven member and output element, the second position sensor generates at least one second sensor output value;
a controller connected to the actuator or separate from the actuator wherein the controller is configured to receive the at least one first sensor output value and the at least one second sensor output value; and
at least one present measurable characteristic calculated by the controller as determined by calculating the difference between the at least one first sensor output value and the at least one second sensor output value, wherein the at least one present measurable characteristic is recorded in a database of the controller.

17. The actuator of claim 16 wherein the at least one present measurable characteristic is a lost motion of the actuator, which is the lag between the motion of the motion of the electrical drive device and the output element.

18. The actuator of claim 16 further comprising a performance determination made by the controller comparing the at least one present measurable characteristic with one or more reference values previously recorded in the database, when the at least one present measurable characteristic is less than the reference value, the characteristic of the actuator is acceptable and when the at least one present measurable characteristic is greater than the reference value, the characteristic the actuator is unacceptable.

19. The actuator of claim 16 further comprising at least one physical stop for defining a position or range of position of the driven member or output element upon the driven member or output element contacting the at least one physical stop and the at least one present measurable characteristic is calculated in part using the at least one physical stop of the driven member or output element.

20. The actuator of claim 16 wherein the at least one first sensor output value and the at least one second sensor output value are measured over at least one interval and the at least one present measurable characteristic is determined for the at least one interval and indicates a rate of change of the at least one present measurable characteristic during the at least one interval.

21. The actuator of claim 20 wherein the at least one interval is lapsed time or engine hours between monitoring the outputs of the at least one first sensor output value and the at least one second sensor output value.

22. The actuator of claim 20 wherein the at least one interval is determined by one of the group consisting of a key-on, a key-off, engine power on, engine power off, at least one first sensor output value, at least one second sensor output value, a predetermined difference between the at least one first sensor output value and the at least one second sensor output value, an input from another sensor and combinations thereof.

23. The actuator of claim 20, wherein the actuator compares the rate of change of the characteristic to a reference value;
   wherein when the difference between rate of the characteristic is less than the reference value, the rate of change of the characteristic is acceptable, and
   wherein when the difference between rate of change of the characteristic is greater than the reference value, the rate of change of characteristic is unacceptable.

24. The actuator of claim 16 wherein the first position sensor and second position sensor are one of an absolute position sensor or a relative position sensor.

25. The actuator of claim 16 wherein the driven member includes the output element, a plurality of engaged gears, a linkage, a plurality of gears and chains, a plurality of gears and drive belts, a plurality of pulleys and drive belts, shafts and a combination thereof.

* * * * *